(12) United States Patent
Herchenbach et al.

(10) Patent No.: US 6,354,953 B1
(45) Date of Patent: Mar. 12, 2002

(54) BEARING RING FOR SUPPORTING A PROTECTIVE DEVICE

(75) Inventors: Paul Herchenbach, Ruppichteroth; Horst Kretschmer; Wilhelm Schott, both of Köln, all of (DE)

(73) Assignee: GKN Walterscheid GmbH (DE)

( * ) Notice: Subject to any disclaimer, the term of this patent is extended or adjusted under 35 U.S.C. 154(b) by 0 days.

(21) Appl. No.: 09/383,498

(22) Filed: Aug. 26, 1999

(30) Foreign Application Priority Data

Aug. 29, 1998 (DE) .......................................... 198 39 469

(51) Int. Cl.⁷ ................................................. F16C 1/28
(52) U.S. Cl. ........................ 464/170; 464/172; 464/902
(58) Field of Search ................................. 464/170, 172, 464/174, 175, 902

(56) References Cited

U.S. PATENT DOCUMENTS

| | | | |
|---|---|---|---|
| 3,498,082 A | * 3/1970 | Geisthof et al. | 464/172 |
| 3,884,536 A | * 5/1975 | Buthe | 464/172 |
| 4,411,636 A | * 10/1983 | Buthe et al. | 464/172 |
| 4,435,166 A | 3/1984 | Bondioli | |
| 4,747,804 A | * 5/1988 | Benzi | 464/170 |
| 5,071,329 A | * 12/1991 | Sano et al. | 464/903 |
| 5,673,598 A | * 10/1997 | Duclos | 74/574 |
| 5,772,521 A | * 6/1998 | Herchenbach et al. | 464/170 |

* cited by examiner

Primary Examiner—Lynne H. Browne
Assistant Examiner—Kenneth Thompson
(74) Attorney, Agent, or Firm—Harness, Dickey & Pierce, P.L.C.

(57) ABSTRACT

A bearing ring (10) for supporting a protective device of a rotating driveshaft is adapted to engage an annular groove of a component of the driveshaft, for example a joint yoke. The bearing ring (10) has a basic ring portion (13) which connects to a component of the protective device. The bearing ring also includes a bearing ring portion (14) which engages the annular groove. The bearing ring (10) is a composite component. The basic ring portion is produced from a different type of plastics than the bearing portion. The bearing portion (14) is produced by being injection molded around the basic ring portion (13). The bearing portion (14) is a PEEK material. Thus, the bearing portion (14) achieves a long service life while the costs of the bearing remain acceptable.

10 Claims, 3 Drawing Sheets

BEARING RING FOR SUPPORTING A PROTECTIVE DEVICE

CROSS-REFERENCE TO RELATED APPLICATIONS

This application claims priority upon German application 198 39 469.1 filed Aug. 29, 1998, which is incorporated herein by reference.

BACKGROUND OF THE INVENTION

The invention relates to a bearing ring for supporting a protective device at a rotating driveshaft. The driveshaft drives, or is in a driveline for, agricultural implements. The bearing ring engages an annular groove of a component of the driveshaft.

Bearing rings are described in U.S. Pat. No. 4,435,166. The bearing ring is divided in one place so that it can be slid over the compartment or the joint yoke. The bearing ring can be made to engage the annular groove of the joint yoke. The bearing ring is provided with means to attach itself to a protective cone and protective tubes surrounding the profiled tubes of the driveshaft. The bearing ring includes the integrally formed-on portions which engage the annular groove.

SUMMARY OF THE INVENTION

It is an object of the present invention to provide a bearing ring which has a long service life even in the case of high sliding speeds and loads acting from the outside.

In accordance with the invention, a bearing ring includes a basic ring portion and a bearing portion. The basic ring portion connects to a component of the protective device. The basic ring portion and the bearing ring portion are of different types of plastics. The bearing ring portion is a plastic material which belongs to the material group of polyetheretherketon (PEEK).

Such a composite structure is advantageous because it is possible to choose a relatively cost-effective flexible material for the basic ring portion, for example polyamide, and a different material for the bearing portion. The bearing portion material, even at high relative sliding speeds and in the case of external loads, has a high temperature resistance which is clearly higher than that of the material of the basic ring portion. Overall, such a composite design also achieves an acceptable cost-effective solution. The permanent service temperatures of such PEEK materials are in excess of the temperature range of 200 to 250 degrees centigrade. Even at high temperature, the thermal expansion coefficient is low relative to that of the usually used materials. Thus, even at such high temperatures, there is no need to provide large tolerances which adversely affect the running characteristics in order to ensure accurate rotation of the driveshaft in the protective device. In addition, the invention enables a lubrication-free bearing operation.

According to a first embodiment, the bearing portion is connected to the basic ring portion in a material-locking way. In a second embodiment, the bearing portion is provided as a separate component. The bearing portion is connected to the basic ring portion in a form-fitting way. In such a case, it is advantageous for the bearing ring portion to include a plurality of bearing segments. To be able to receive the bearing segments, the basic ring portion has recesses which start from its bore and extend over part of the circumference of the ring portion. The bearing segments are arranged in the recesses. The bearing segments additionally partially embrace the side faces of the basic ring portion.

In order to fix the bearing segments, the basic ring portion includes recesses which are resiliently engaged by projections on bearing segments. Good running characteristics are achieved if the inwardly pointed faces of the bearing segments include chamfers at their ends. Particularly advantageous service life characteristics are achieved if a PEEK material with a fiber content is selected, with the fibers being carbon fibers. The percentage of fibers should range between 10% and 30% of the weight of the bearing portion.

From the following detailed description, taken in conjunction with the accompanying drawings and subjoined claims, other objects and advantages of the present invention will become apparent to those skilled in the art.

DETAILED DESCRIPTION OF THE PREFERRED EMBODIMENT

Figure 1:
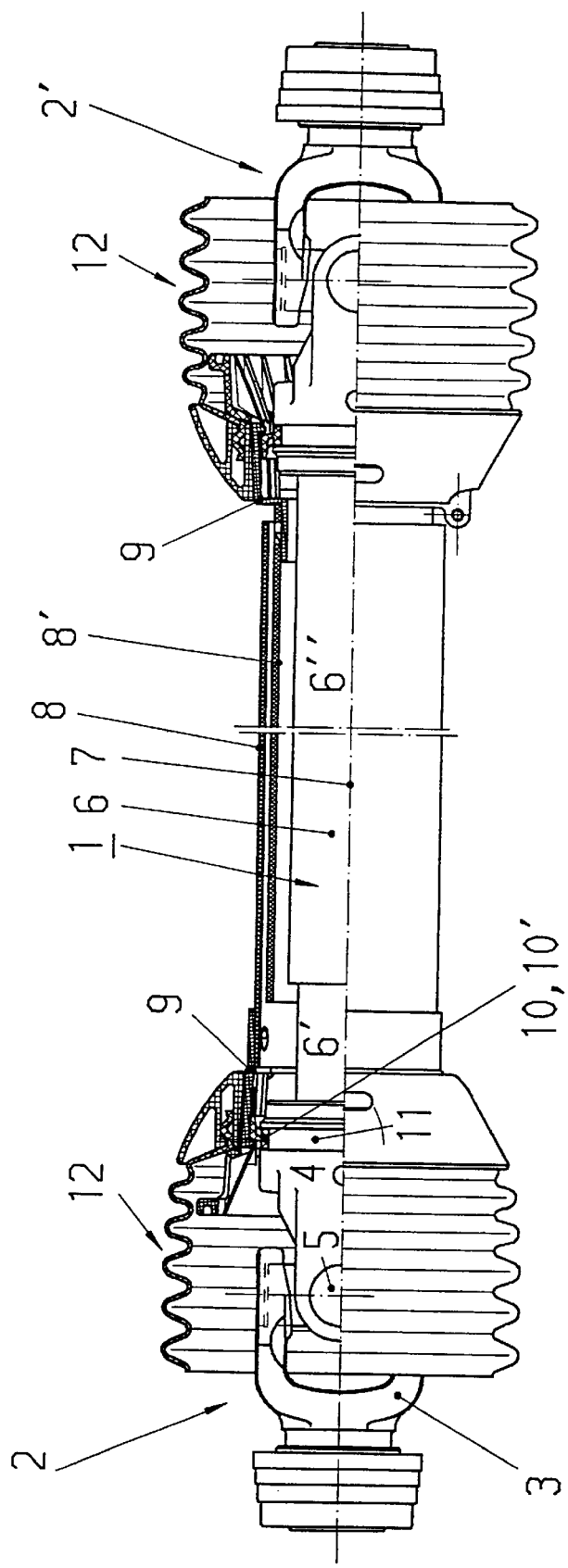
FIG. 1 is a side view of an agricultural driveshaft with a protective device partially in section.

The driveshaft 1 shown in FIG. 1 comprises two substantially identical universal joints 2, 2'. Below, only one of the universal joints is described. The universal joint 2 includes a first joint yoke 3 which connects to a power takeoff shaft of a tractor, for example. The identically designed joint yoke at the other end of the driveshaft associated with the other universal joint 2' connects, for example, to the input shaft of a to-be-driven implement.

The joint yoke 3 of the universal joint 2 is articulatably connected by a cross member 5 to the second joint yoke 4. The two second joint yokes 4 of the two universal joints 2, 2' are connected to one another by an intermediate shaft 6. The intermediate shaft 6 has two profiled tubes, first profiled tube 6' and second profiled tube 6". The first profiled tube 6' is connected in a rotationally fast way to the joint yoke 4 of the universal joint 2. The first profiled tube 6' is telescopically inserted into the profiled tube 6" which is connected to the second universal joint 2'. It is thus possible to change the distance between the two universal joints 2, 2' along the longitudinal axis 7. Under operational conditions, the intermediate shaft 6 rotates together with the attached joint yokes of the two universal joints 2, 2' around the longitudinal axis 7. During operation, the two universal joints 2, 2' are able to change their positions relative to one another. This change results in changes in length which are compensated for by the two profiled tubes 6', 6" inserted into one another.

To prohibit contact of the rotating driveshaft 1 and to prevent foreign material from being wound around the rotating driveshaft, a protective device is provided which includes two protective tubes 8, 8'. The first protective tube 8 is attached to an attaching cap 9. The cap 9 is connected to a bearing ring 10, 10'. The bearing ring 10, 10' engages an annular groove 11 in the second joint yoke 4. The annular groove 11 extends around the longitudinal axis 7. The bearing ring 10, 10' secures the protective cap in the direction of the longitudinal axis 7 at the joint yoke 4. At the same time, the protective cap enables the driveshaft 1 to rotate. This permits a relative movement between the joint yoke 4 and the bearing ring 10, 10'. Furthermore, the connecting cap 9 carries the protective cone 12. The protective cone 12 at least partially covers the universal joint 2. The protective cone 12 is complemented by a protective cone attached as a stationary or protective hood (not illustrated) which is secured to the tractor for example.

The second protective tube 8' is telescopically inserted into the first protective tube 8. The second protective tube 8' is also connected to the joint yoke of the universal joint 2' by an attaching cap and a further bearing ring, in the direction of the longitudinal axis 7, so as to be rotationally fast and to be relatively rotatable relative to the second universal joint 2' around the longitudinal axis 7.

The attaching cap 9 associated with the universal joint 2' also carries a protective cone 12. The protective cone 12 at least partially covers the universal joint 2'. The protective cone 12 is also complemented by a hood (not illustrated) which is firmly attached to the implement, for example, to which the universal joint is connected. The protective device is non-rotatingly held by tensioning means or the like relative to the implement to which the driveshaft 1 is connected. Thus, the protective device is stationary when the driveshaft 1 rotates.

Figure 3:
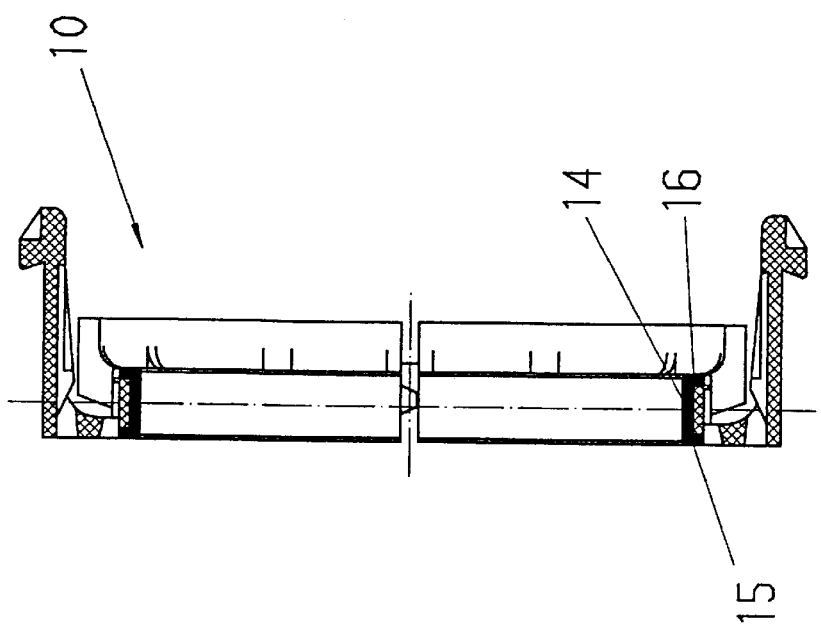
FIG. 3 is a section view of FIG. 2 along line 3—3 thereof.
Figure 2:
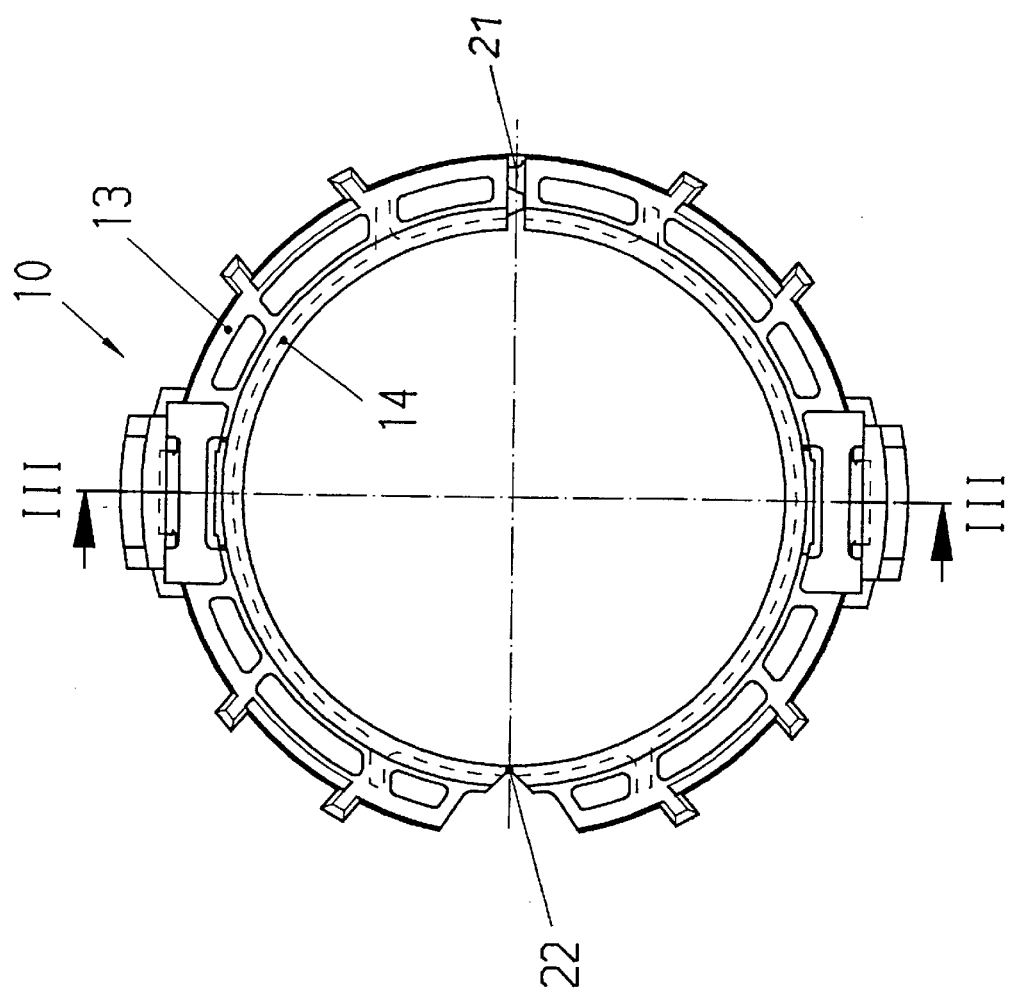
FIG. 2 is a side view of a first embodiment of a bearing ring in accordance with the present invention.
Figure 4:
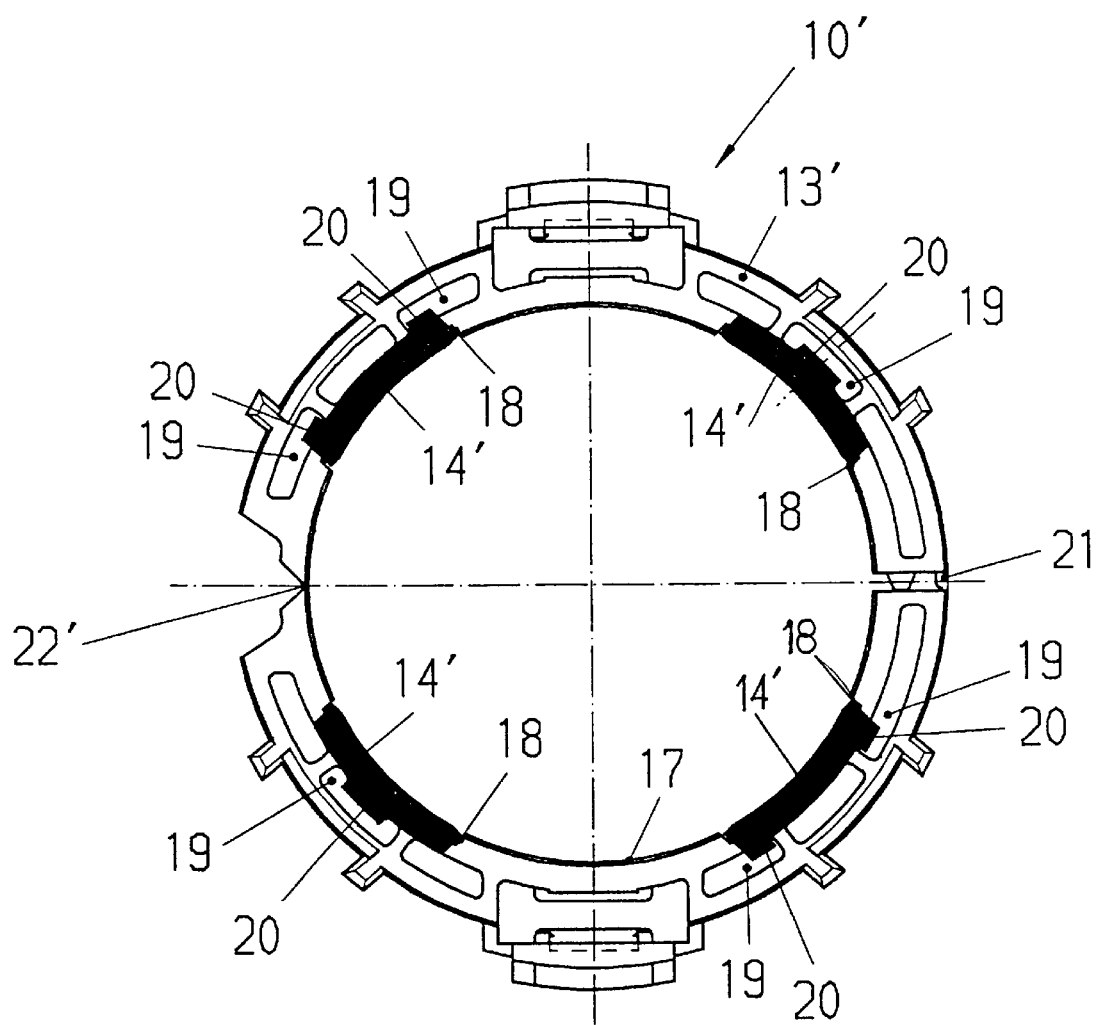
FIG. 4 is a plan view of an additional embodiment of a bearing ring in accordance with the present invention.

FIGS. 2 to 4 show two embodiments of a bearing ring 10 and 10', respectively, in the form of individual components. The rings 10, 10' are illustrated in an enlarged scale relative to FIG. 1. The bearing ring 10 according to FIGS. 2 and 3 include a basic ring portion 13. The basic ring portion 13 has circumferentially distributed apertures and means for securing the ring 13 to the attaching cap. The connection with the attaching cap is effected in the direction of rotation around and also in the direction of the longitudinal axis 7. The basic ring portion 13 is slotted at a separating line. Thus, the ring portion 13 can be radially expanded to allow the ring portion 13 to be slid over the joint yoke into the annular groove 11.

One half of the bearing ring 10 pivots around a pivot point 22 relative to the other half of the bearing ring 10. The material is brittle. Accordingly, the pivot point 22 serves as a nominal feature point.

Furthermore, the basic ring portion 13 comprises a bore 17 and side faces 15, 16. The side faces 15, 16 are enclosed by a bearing portion 14. The bearing portion 14 is connected to the basic ring portion 13 in a material-locking way. The basic ring portion 13 is an injection molded part made of plastics, for example polyamide. The bearing portion 14 is connected to the basic ring portion 13 in a material-locking way by being injection molded around the ring portion 13. The bearing portion 14, which engages the annular groove, is polyetheretherketon (PEEK). This provides the bearing portion with advantageous sliding properties and, in addition, high temperature resistance. Further, the PEEK material may include carbon fibers. The fiber presents from about 10% to about 30% by weight of the bearing portion 14.

FIG. 4 shows a further embodiment of a bearing ring 10'. Here, the basic ring portion 13' is divided in one place. The separating line has been given the reference number 21. Four circumferentially distributed recesses 18 are provided in the bore 17 of the basic ring portion 13. The recesses 18 extend across a circular arc. A bearing ring segment is received in each recess 18. The segments, together, form the bearing portion 14'. The bearing segments are separate components which partially embrace the side faces of the basic ring portion 13.

Projections 20 on the segments resiliently engage further recesses 19 designed as through-apertures. It can be seen that two bearing segments which form the bearing portion 14' include two opposed projections 20. One projection starts from the front face and one projection starts from the rear face. Each projection engages a recess 19.

Two further bearing segments include a total of four projections, two per side face. Only the bearing segments forming the bearing portion 14' are in contact with the faces of the annular groove of the yoke. The bearing portions 14 are inserted into the annular groove to support the protective device. The faces which are in contact with the base face of the annular groove of the yoke, at their ends, each include a chamfer to ensure advantageous running characteristics.

While the above detailed description describes the preferred embodiment of the present invention, the invention is susceptible to modification, variation and alteration without deviating from the scope and fair meaning of the subjoined claims.

What is claimed is:

1. A bearing ring for supporting a protective device at a rotating driveshaft for driving, or for drives in, agricultural implements, said protective device engaging an annular groove of a component of the driveshaft, said bearing ring comprising:
   a basic ring portion for connecting to a component of the protective device;
   a bearing portion for engaging the annular groove, said basic ring portion and said bearing portion being of different types of plastics and with said bearing portion selected from a group consisting of plastic material which belongs to the material group of polyetheretherketon (PEEK).

2. A bearing ring according to claim 1, wherein the bearing portion is connected to the basic ring portion in a material-locking way.

3. A bearing ring according to claim 1, wherein the bearing portion is connected to the basic ring portion in a form-fitting way.

4. A bearing ring according to claim 1, wherein the bearing portion is formed of bearing segments.

5. A bearing ring according to claim 4, wherein the basic ring portion includes a bore with recesses which start from said bore and which contain the bearing segments which additionally laterally embrace the side faces of the basic ring portion.

6. A bearing ring according to claim 5, wherein the basic ring portion is provided with recesses and said bearing segments are provided with projections engaging the recesses.

7. A bearing ring according to claim 4, wherein the inwardly pointing face of a bearing segment is provided with chamfers at its ends.

8. A bearing ring according to claim 1, wherein the PEEK material includes a percentage of fibers.

9. A bearing ring according to claim 8, wherein the fibers are carbon fibers.

10. A bearing ring according to claim 8, wherein the percentage of fibers ranges between 10% and 30% by weight of the bearing portion.

* * * * *